United States Patent Office 3,822,282
Patented July 2, 1974

3,822,282
HERBICIDAL AND/OR FUNGICIDAL 5-POLY-HALOETHYLIMINO- AND 5 - POLYHALO-VINYLIMINO-2,4-IMIDAZOLIDINEDIONE
Malcolm Scott Singer, Richmond, Calif., assignor to Chevron Research Company, San Francisco, Calif.
No Drawing. Filed Mar. 29, 1972, Ser. No. 239,357
Int. Cl. C07d 49/32
U.S. Cl. 260—309.5
10 Claims

ABSTRACT OF THE DISCLOSURE 5-(1-hydroxy - 2,2,2 - trihaloethylimino)-, 5-(1,2,2,2-tetrahaloethylimino)- and 5 - (polyvinylhaloethylimino)-2,4-imidazolidinediones and their use as herbicides and/or fungicides.

BACKGROUND OF THE INVENTION

Field of the invention

This invention relates to 5-imino-2,4-imidazolidinediones and their use as herbicides and fungicides.
Canadian Pat. No. 879,711, issued Aug. 31, 1971, to M. S. Singer, common assignee, discloses herbicidal 5-imino-2,4-imidazolidinediones wherein the nitrogen in the 1 position of the imidozolidinedione nucleus is substituted with an aryl radical, the nitrogen in the 3 position is substituted with an aliphatic radical and the imino group is optionally substituted with a carbamoyl or N-chloroacetylcarbamoyl radical.

DESCRIPTION OF THE COMPOUNDS OF THE INVENTION

The imidazolidinediones of the invention are represented by the formula (I)

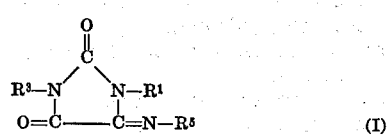

(I)

wherein $R^1$ and $R^3$ independently are alkyl of 1 to 4 carbon atoms, phenyl substituted with from 1 to 4 halogens of atomic number 9 to 35 (fluorine, chlorine or bromine) or from 1 to 2 alkoxy groups of 1 to 4 carbon atoms, alkaryl of from 7 to 12 carbon atoms, or alkaryl of from 7 to 12 carbon atoms and substituted with from 1 to 4 halogens of atomic number 9 to 35 or from 1 to 2 alkoxy groups of 1 to 4 carbon atoms; and $R^5$ is 1-hydroxy-2,2,2-trihaloethyl, 1,2,2,2-tetrahaloethyl, trihalovinyl or dihalovinyl wherein the halogen is of atomic number 17 to 35 (chlorine or bromine).

Illustrative alkyl $R^1$ and $R^3$ groups are methyl, ethyl-isopropyl, n-propyl, and n-butyl. Illustrative aromatic $R^1$ and $R^3$ groups are phenyl; alkaryl groups such as tolyl, xylyl, p-ethylphenyl; and alkoxy- and halo-substituted phenyl and alkaryl such as 2-fluorophenyl, 2-chlorophenyl, 3 - chlorophenyl, 3 - fluorophenyl, 4 - fluorophenyl,, 4 - chlorophenyl, 2,4 - difluorophenyl, 3,4 - difluorophenyl, 2,4 - dichlorophenyl, 3-bromophenyl, 3,5-difluorophenyl, 3,5-dichlorophenyl, 2-fluoro-4-methylphenyl, 2-methyl-4-chlorophenyl, 4-methoxyphenyl, 2,4 - diethoxyphenyl, 2-butoxyphenyl, 2-propoxy-4-methylphenyl, 2 - chloro-4-methoxyphenyl. Illustrative $R^5$ groups are 1-hydroxy-2,2,-2-trichloroethyl, 1-hydroxy - 2,2,2 - tribromoethyl- 1-hydroxy - 2 - bromo - 2,2 - dichloroethyl, 1,2,2,2 - tetrachloroethyl, 1,2,2,2 - tetrabromoethyl, 1,2,2 - trichloro-2-bromoethyl, trichlorovinyl, 1,2-dichloro-2-bromovinyl, tribromovinyl, 2,2-dichlorovinyl, 2,2-dibromovinyl.

Representative imidazolidinediones of formula (I) are 1-methyl-3-(4-fluorophenyl)-5-(1,2,2,2-tetrachloroethylimino)-imidazolidine-2,4-dione,
1-ethyl-3-(2,4-difluorophenyl)-5-(1-hydroxy-2,2,2-trichloroethylimino)-imidazolidine-2,4-dione,
1-propyl-3-tolyl-5-(1-hydroxyl-2,2,2-tribromoethylimino)-imidazolidine-2,4-dione,
1-isopropyl-3-(3,5-dibromophenyl)-5-(1-hydroxy-2,2,2-trichloroethylimino)-imidazolidine-2,4-dione,
1-phenyl-3-methyl-5-(1,2,2,2-tetrabromoethylimino)-imidazolidine-2,4-dione,
1-(4-chlorophenyl)-3-ethyl-5-(1-bromo-2,2,2-trichloroethylimino)-imidazolidine-2,4-dione,
1-(2,4-dichlorophenyl)-3-propyl-5-(1,2,2,2-tetrachloroethylimino)-imidazolidine-2,4-dione,
1-(2,4-dichlorophenyl)-3-propyl-5-propyl-5-(1,2,2,2-tetrachloroethylimino)-imidazolidine-2,4-dione,
1-(3,5-dichlorophenyl)-3-n-butyl-5-(1,2,2,2-tetrachloroethylimino)-imidazolidine-2,4-dione,
1-methyl-3-(2-fluorophenyl)-5-(1,2,2,2-tetrachloroethylimino)-imidazolidine-2,4-dione,
1-methyl-3-(2-chlorophenyl)-5-(1-hydroxy-2,2,2-trichloroethylimino)-imidazolidine-2,4-dione,
1-methyl-3-phenyl-5-(1-hydroxy-2,2,2-trichloroethylimino)-imidazolidine-2,4-dione,
1-methyl-3-(2,4-difluorophenyl)-5-(1-hydroxy-2,2,2-trichloroethylimino)-imidazolidine-2,4-dione,
1-(2-fluorophenyl)-3-methyl-5-(1,2,2,2-tetrachloroethylimino)-imidazolidine-2,4-dione,
1(2-chlorophenyl)-3-methyl-5-(1,2,2-trichloro-2-bromoethylimino)-imidazolidine-2,4-dione,
1-(2-bromophenyl)-3-methyl-5-(1-hydroxy-2,2-dichloro 2-bromoethylimino)-imidazolidine-2,4-dione,,
1-(2,4-difluorophenyl)-3-methyl-5-(1,2,2,2-tetrachloroethylimino)-imidazolidine-2,4-dione,
1-(2-fluorophenyl)-3-methyl-5-(trichlorovinylimino)-imidazolidine-2,4-dione,
1-(4-chlorophenyl)-3-methyl-5-(trichlorovinylimino)-imidazolidine-2,4-dione,
1-methyl-3-phenyl-5-(trichlorovinylimino)-imidazolidine-2,4-dione,
1-(3,4-dichlorophenyl)-3-methyl-5-(dichlorovinylimino)-imidazolidine2,4-dione,
1-methyl-3-(3,5-difluorophenyl)-5-(trichlorovinylimino)-imidazolidine-2,4-dione,
1-methyl-3-(4-bromophenyl)-5-(dibromovinylimino)-imidazolidine-2,4-dione,
1-(4-methoxyphenyl)-3-methyl-5-(1,2-dichloro-2-bromovinylimino)-imidazolidine-2,4-dione,
1-methyl-3-(3-methoxyphenyl)-5-(1-bromo-2,2-dichlorovinylimino)-imidazolidine-2,4-dione.

Preferred compounds of formula I are those wherein one $R^1$ or $R^3$ group is phenyl, alkaryl, alkoxy- or halo-substituted phenyl or alkaryl and the other $R^1$ or $R^3$ group is alkyl, especially methyl. Particularly preferred compounds of formula I are those wherein one $R^1$ or $R^3$ is halo-substituted phenyl or alkaryl of 1 to 2 halogens of atomic number 9 to 17 and the other $R^1$ or $R^3$ is methyl.

The imidazolidinediones of the invention where $R^5$ is a 1-hydroxy-2,2,2-trihaloethyl group are prepared by reacting a 5-iminoimidazolidine-2,4-dione with a trihaloacetaldehyde according to the following equation (1):

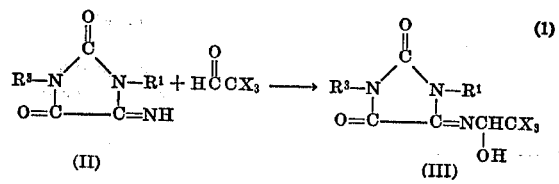

wherein $R^1$ and $R^3$ have the same significance as previously defined and X is chloro or bromo. It is appreciated, of course, that the

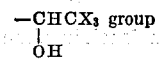

is the group $R^5$ of formula (I).

The 5-iminoimidazolidine-2,4-dione reactants (formula II) are known compounds and are described in Canadian Pat. 879,711, issued Aug. 31, 1971, to M. S. Singer.

Suitable trihaloacetaldehyde reactants are trichloroacetaldehyde, dichlorobromoacetaldehyde and tribromoacetaldehyde.

The reaction depicted by equation (1) is conducted in an inert solvent or neat. Generally, stoichrometric amounts of imidazolidinedione and aldehyde are employed. The reaction is preferably catalyzed by a small amount of a strong inorganic acid, e.g., sulfuric or perchloric acid. The reaction temperature is generally in the range of about 20 to 100° C. The reaction proceeds rapidly and is generally complete in a matter of minutes. Reaction times of from 30 seconds to 10 hours are generally sufficient.

The imidazolidinediones of the invention wherein $R^5$ is a 1,2,2,2 - tetrahaloethyl group are prepared by reacting the hydroxyimidazolidinedione (represented by formula III) either in purified form or in the reaction mixture of equation (1) with a thionyl halide according to the following equation (2):

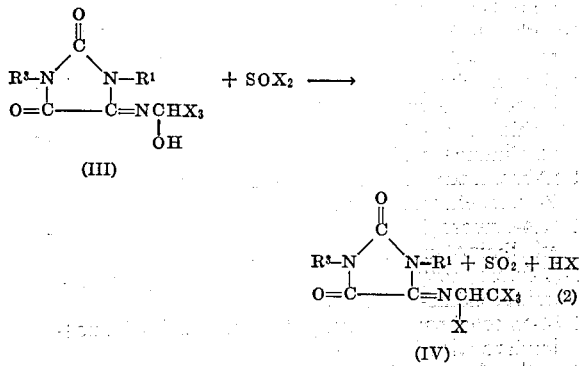

wherein $R^1$, $R^3$ and X have the same significance as previously defined.

The reaction depicted by equation (2) is accomplished by using from one mole to an excess of as much as 20 moles of the thionyl halide per mole of the imidazolidinedione reactant (III). The reaction temperature suitably varies from 20 to 100° C. and the reaction time suitably varies from 1 to 20 hours. If desired, the chloro- or bromoimidazolidinedione (IV) can be prepared directly from the 5-iminoimidazolidinedione reactant (II), the aldehyde reactant and the thionyl halide reactant in the same reactor by general procedure employed for the reaction depicted by equation (2).

The compounds of the invention wherein $R^5$ is a 2,2-dihalovinyl or trihalovinyl group are prepared by dehalogenation or dehydrohalogenation of the tetrahaloethyl compound (IV), as depicted by the following equation (3):

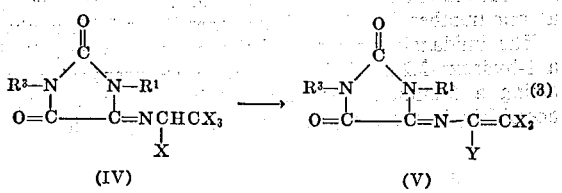

wherein $R^1$, $R^3$ and X have the same significance as previously defined, and Y is X or hydrogen. It is appreciated, of course, that Y is X when equation (3) depicts a dehydrohalogenation reaction and that Y is hydrogen when equation (3) depicts a dehalogenation reaction. The dehydrohalogenation reaction is conducted under very mild basic conditions by conventional procedures at a temperature of from about 0 to 30° C. and for a reaction time of about 15 minutes to 2 hours. The dehalogenation reaction is conducted by reacting the tetrahaloethyl compound (IV) with zinc metal by conventional procedures, e.g., in inert solvent at 25 to 100° C.

The preparation of the compounds of the invention are further illustrated by the following examples:

EXAMPLE 1

Preparation of 1-phenyl-3-methyl-5-(1-hydroxy-1,2,2,2-tetrachloroethylimino)-imidazolidine-2,4-dione 1 - phenyl - 3 - methyl-5-iminoimidazolidine-2,4-dione (15.0 g., 0.074 mole) was slurried in 40 ml. chloroform. Chloral (21.8 g., 0.148 mole) was added directly to the slurry. Exothermicity raised the temperature 20° C. The reaction mixture was momentarily homogeneous before an abundance of product precipitated. An additional 100 ml. chloroform was added at this point. After 0.5 hour the mixture was filtered. The filter cake was washed with chloroform and dried. The product melted at 130–133° C.

Elemental analysis showed:

| | Calculated | Found |
|---|---|---|
| C, percent | 41.1 | 41.8 |
| H, percent | 2.9 | 2.8 |
| N, percent | 12.0 | 12.3 |
| Cl, percent | 30.3 | 30.6 |

EXAMPLE 2

Preparation of 1-(2-fluorophenyl)-3-methyl-5-(1,2,2,2-tetrachloroethylimino)-imidazolidine-2,4-dione 1-(2-fluorophenyl)-3-methyl - 5 - iminoimidazolidine-2,4-dione (10.0 g., 0.045 mole) was slurried in 80 ml. 1,2-dimethoxyethane. Chloral (13.4 g., 0.090 mole) was added followed by the addition of 10.8 g. (0.090 mole) thionyl chloride. The reaction mixture became homogeneous as the temperature rose from the heat of reaction. Temperature was maintained at 35–45° C. for ½ hour. Solvent was removed from the mixture and the residue was taken up in benzene. Filtration removed some high melting white solids. Hexane was added to precipitate the product which was filtered and washed with ether. The product melted at 175–177° C.

Elemental analysis showed:

| | Calculated | Found |
|---|---|---|
| C, percent | 37.2 | 37.5 |
| H, percent | 2.1 | 1.9 |
| N, percent | 10.9 | 10.9 |
| Cl, percent | 36.6 | 36.3 |

EXAMPLE 3

Preparation of 1-(4-chlorophenyl)-3-methyl-5-(trichlorovinylimino)imidazolidine-2,4-dione 1-(4-chlorophenyl) - 3 - methyl-5-(1,2,2,2-tetrachloroethylimino)imidazolidine-2,4-dione (10.0 g., 0.025 mole) was slurried in 35 ml. acetonitrile. As triethylamine (2.5 g., 0.025 mole) was added the mixture became homogeneous and turned yellow. A precipitate began forming very soon after the triethylamine was added. Two hours later the mixture was filtered. The solid was a water soluble amine hydrochloride. The filtrate was taken up in 75 ml. methylene chloride, washed once with 75 ml. $H_2O$ and dried over anhydrous magnesium sulfate. After filtration and solvent removal the residual oil crystallized. It was stirred in ethanol and filtered to give 5.0 g., melting point 108–111° C., of a yellow solid.

Elemental analysis showed:

| | Calculated | Found |
|---|---|---|
| C, percent | 39.27 | 40.6 |
| H, percent | 1.92 | 1.7 |
| N, percent | 11.45 | 11.7 |

EXAMPLE 4

Preparation of 1-(2-fluorophenyl)-3-methyl-5-(dichlorovinylimino)-imidazolidine-2,4-dione A mixture of 5 g. (0.012 mole) 1-(2-fluorophenyl)-3-methyl-5-(1 - bromo - 2,2,2 - trichloroethylimino)-imidazolidine-2,4-dione and 1.6 g. (0.024 mole) zinc powder in 15 ml. dimethoxyethane was heated under reflux for 16 hours. The hot reaction mixture filtered and the solvent removed by evaporation under reduced pressure. The residue was a yellow oil which crystallized from ethanol as a pale yellow powder, melting point 135–138° C.

Elemental analysis showed:

|  | Calculated | Found |
|---|---|---|
| C, percent | 45.6 | 45.0 |
| H, percent | 2.6 | 2.2 |
| Cl, percent | 22.4 | 22.09 |
| N, percent | 13.29 | 13.4 |

Other compounds of the invention were prepared using the methods as described above. These compounds are tabulated in Table I.

tion was added to approximately 125 ml. of water containing 156 mg. of surfactant.

Seeds of the test vegetation were planted in a pot of soil and the imidazolidinedione solution was sprayed uniformly onto the soil surface at a dose of 100 mg. per cm.$^2$. The pot was watered and placed in a greenhouse. The pot was watered intermittently and was observed for seedling emergence, health of emerging seedlings, etc. for a 3-week period. At the end of this period the herbicidal effectiveness of the imidazolidinedione was rated based on the physiological observations. A 0 to 100 scale was used; 0 representing no phytotoxicity, 100 representing complete kill.

The results of these tests appear in Table II. The abbreviations employed in the table are defined as follows:

O=Wild Oats (*Avena fatua*)
W=Watergrass (*Echinochloa crusgalli*)
C=Crabgrass (*Digitaria sanguinalis*)
M=Mustard (*Brassica arvensis*)
P=Pigweed (*Amaranthus retroflexus*)
L=Lambsquarter (*Chenopodium album*)

TABLE I

| Compound | Melting point (° C.) | Calculated C | H | Cl | N | Found C | H | Cl | N |
|---|---|---|---|---|---|---|---|---|---|
| 1-ethyl-3-phenyl-5-(1-hydroxy-2,2,2-trichloroethylimino)-imidazolidine-2,4-dione | 140–145 | 42.8 | 3.3 | 29.2 | 11.5 | 43.9 | 3.9 | 29.3 | 11.8 |
| 1-phenyl-3-methyl-5-(1,2,2,2-tetrachloroethylimino)-imidazolidine-2,4-dione | 147–151 | 39.1 | 2.5 | 38.4 | 11.3 | 40.6 | 2.6 | 36.0 | 11.7 |
| 1-(2-fluorophenyl)-3-methyl-5-(1,2,2-trichloro-2-bromoethylimino)-imidazolidine-2,4-dione | 157–160 |  |  | a 9.26 |  |  |  | a 9.0 |  |
| 1-(3,4-dichlorophenyl)-3-methyl-5-(1,2,2,2-tetrachloroethylimino)-imidazolidine-2,4-dione | 178–180 | 32.9 | 1.6 | 48.6 | 9.6 | 32.5 | 1.4 | 48.3 | 11.5 |
| 1-(2-fluorophenyl)-3-methyl-5-(trichlorovinylimino)-imidazolidine-2,4-dione | Oil | 41.1 | 2.0 | 30.3 | 12.0 | 43.2 | 2.5 | 27.8 | 11.5 |
| 1-(3-chlorophenyl)-3-methyl-5-(trichlorovinylimino)-imidazolidine-2,4-dione | Oil | 39.3 | 1.9 | 38.6 | 11.5 | 40.2 | 1.8 | 40.5 | 11.2 |
| 1-(phenyl)-3-methyl-5-(trichlorovinylimino)-imidazolidine-2,4-dione | 112–115 | 43.3 | 2.4 | 32.0 | 12.6 | 45.5 | 2.5 | 29.8 | 12.7 |
| 1-methyl-3-phenyl-5-(trichlorovinylimino)-imidazolidine-2,4-dione | 128–130 | 43.3 | 2.4 | 32.0 | 12.6 | 43.5 | 2.3 | 31.4 | 13.4 |
| 1-(p-tolyl)-3-methyl-5-(trichlorovinylimino)-imidazolidine-2,4-dione | Oil | 45.1 | 2.9 |  | 12.1 | 45.8 | 3.0 |  | 14.0 |
| 1-(3,4-dichlorophenyl)-3-methyl-5-(trichlorovinylimino)-imidazolidine-2,4-dione | Oil | 35.9 | 1.5 |  | 10.5 | 36.7 | 2.2 |  | 11.1 |
| 1-ethyl-3-phenyl-5-(trichlorovinylimino)-imidazolidine-2,4-dione | 111–114 |  |  | 30.7 |  |  |  | 29.7 |  |
| 1-methyl-3-(3-chlorophenyl)-5-(trichlorovinylimino)-imidazolidine-2,4-dione | 166–170 |  |  | 38.6 |  |  |  | 36.6 |  |
| 1-methyl-3-(m-tolyl)-5-trichlorovinylimino)-imidazolidine-2,4-dione | 97–100 |  |  | 30.7 |  |  |  | 30.7 |  |
| 1-n-butyl-3-phenyl-5-(trichlorovinylimino)-imidazolidine-2,4-dione | Oil | 48.1 | 3.8 |  | 11.2 | 47.0 | 4.2 |  | 12.2 |
| 1-methyl-3-(2-fluorophenyl)-5-(trichlorovinylimino)-imidazolidine-2,4-dione | 119–24 |  |  | 30.3 |  |  |  | 30.2 |  |
| 1-methyl-3-phenyl-5-(1,2,2,2-tetrachloroethylimino)-imidazolidine-2,4-dione | 158–160 | 39.1 | 2.5 | 38.4 | 11.4 | 39.2 | 2.3 | 38.5 | 11.4 |
| 1-(2-fluorophenyl)-3-methyl-5-(1-hydroxy-2,2,2-trichloroethylimino)-imidazolidine-2,4-dione | 119–122 |  |  | 28.9 |  |  |  | 28.8 |  |
| 1-methyl-3-phenyl-5-(1-hydroxy-2,2,2-trichloroethylimino)-imidazolidine-2,4-dione | 185–188 | 41.1 | 2.9 | 11.5 | 30.5 | 41.8 | 3.1 | 12.2 | 28.5 |
| 1-p-tolyl-3-methyl-5-(1-hydroxy-2,2,2-trichloroethylimino)-imidazolidine-2,4-dione | 170–172 | 42.8 | 3.3 | 29.2 | 11.5 | 41.7 | 3.1 | 29.4 | 11.4 |
| 1-(4-methoxyphenyl)-3-methyl-5-(1-hydroxy-2,2,2-trichloroethylimino)-imidazolidine-2,4-dione | 162–165 | 41.0 | 3.2 | 27.9 | 11.0 | 40.3 | 2.9 | 25.8 | 11.4 |
| 1-(4-methoxyphenyl)-3-methyl-5-(1,2,2,2-tetrachloroethylimino)-imidazolidine-2,4-dione | 136–138 | 39.1 | 2.8 | 35.5 | 10.5 | 39.2 | 2.7 | 35.2 | 10.9 | a Total halogen in milliequivalents/grams.

UTILITY

The imidazolidinediones of the present invention are, in general, herbicidal in both pre- and post-emergence applications. For pre-emergence control of undesirable vegation these imidazolidinediones will be applied in herbicidal quantities to the environment, e.g., soil infested with seeds and/or seedlings of such vegetation. Such application will inhibit the growth of or kill the seeds, germinating seeds and seedlings. For post-emergence applications the imidazolidinediones of the present invention will be applied directly to the foliage and other plant parts. Generally they are effective against weed grasses as well as broadleaved weeds. Some may be selective with respect to type of application and/or type of weed.

The imidazolidinediones of the invention are particularly effective as pre-emergence heribicides.

Pre-emergence herbicidal tests on representative imidazolidinediones of the invention were made using the following method:

EXAMPLE 5

Pre-Emergence Herbicide Test

An acetone solution of the test imidazolidinedione was prepared by mixing 750 mg. imidazolidinedione, 220 mg. of a nonionic surfactant and 25 ml. of acetone. This solu-

TABLE II

| Compound | Herbicidal effectiveness | | | | | |
|---|---|---|---|---|---|---|
|  | O | W | C | M | P | L |
| 1-phenyl-3-methyl-5-(1-hydroxy-2,2,2-trichloroethylimino)-imidazolidine-2,4-dione | 100 | 100 | 100 | 100 | 100 | 100 |
| 1-(2-fluorophenyl)-3-methyl-5-(1,2,2,2-tetrachloroethylimino)-imidazolidine-2,4-dione | 100 | 100 | 100 | 100 | 100 | 100 |
| 1-ethyl-3-phenyl-5-(1-hydroxy-2,2,2-trichloroethylimino)-imidazolidine-2,4-dione | 70 | 80 | 90 | 85 | 45 | 40 |
| 1-phenyl-3-methyl-5-(1,2,2,2-tetrachloroethylimino)-imidazolidine-2,4-dione | 65 | 50 | 80 | 100 | 90 | 90 |
| 1-(2-fluorophenyl)-3-methyl-5-(1,2,2-trichloro-2-bromoethylimino)-imidazolidine-2,4-dione | 95 | 100 | 100 | 100 | 100 | 100 |
| 1-(3,4-dichlorophenyl)-3-methyl-5-(1,2,2,2-tetrachloroethylimino)-imidazolidine-2,4-dione | 65 | 100 | 100 | 100 | 100 | 100 |
| 1-(2-fluorophenyl)-3-methyl-5-(trichlorovinylimino)-imidazolidine-2,4-dione | 100 | 100 | 100 | 100 | 100 | 100 |
| 1-(3-chlorophenyl)-3-methyl-5-trichlorovinylimino)-imidazolidine-2,4-dione | 60 | 30 | 60 | 95 | 25 | 25 |
| 1-(4-chlorophenyl)-3-methyl-5-(trichlorovinylimino)-imidazolidine-2,4-dione | 50 | 70 | 75 | 100 | 95 | 95 |
| 1-methyl-3-phenyl-5-(trichlorovinylimino)-imidazolidine-2,4-dione | 80 | 45 | 90 | 100 | 95 | 90 |
| 1-(3,4-dichlorophenyl)-3-methyl-5-(trichlorovinylimino)-imidazolidine-2,4-dione | 30 | 40 | 70 | 100 | 100 | 100 |
| 1-(2-fluorophenyl)-3-methyl-5-(trichlorovinylimino)-imidazolidine-2,4-dione | 80 | 35 | 75 | 100 | 100 | 75 |

TABLE II—Continued

| Compound | Herbicidal effectiveness | | | | | |
|---|---|---|---|---|---|---|
| | O | W | C | M | P | L |
| 1-ethyl-3-phenyl-5-(trichlorovinylimino)-imidazolidine-2,4-dione | 0 | 0 | 100 | 60 | 30 | 20 |
| 1-methyl-3-(2-fluorophenyl)-5-(trichlorovinylimino)-imidazolidine-2,4-dione | 100 | 100 | 100 | 100 | 100 | 100 |
| 1-methyl-3-phenyl-5-(1,2,2,2-tetrachloroethylimino)-imidazolidine-2,4-dione | 100 | 100 | 100 | 100 | 100 | 100 |
| 1-(2-fluorophenyl)-3-methyl-5-(1-hydroxy-2,2,2-trichloroethylimino)-imidazolidine-2,4-dione | 90 | 100 | 100 | 100 | 100 | 100 |
| 1-methyl-3-phenyl-5-(1-hydroxy-2,2,2-trichloroethylimino)-imidazolidine-2,4-dione | 90 | 100 | 100 | 100 | 100 | 100 |
| 1-p-tolyl-3-methyl-5-(1-hydroxy-2,2,2-trichloroethylimino)-imidazolidine-2,4-dione | 95 | 65 | 100 | 100 | 100 | 100 |
| 1-(4-methoxyphenyl)-3-methyl-5-(1-hydroxy-2,2,2-trichloroethylimino)-imidazolidine-2,4-dione | 85 | 65 | 100 | 100 | 95 | 95 |
| 1-(4-methoxyphenyl)-3-methyl-5-(1,2,2,2-tetrachloroethylimino)-imidazolidine-2,4-dione | 65 | 60 | 95 | 100 | 100 | 100 |

When used as herbicides, the amount of imidazolidinedione administered will vary with the particular plant part or plant growth medium which is to be contacted, the general location of application, i.e., sheltered areas such as greenhouses as compared to exposed areas such as fields, as well as the desired type of control. For pre-emergent control of most plants dosages in the range of about 0.5 to 20 lbs. per acre will be used. Such administration will give a concentration of about 2 to 80 p.p.m. imidazolidinedione distributed throughout 0.1 acre-foot. For post-emergence application, such as foliar spray application, compositions containing about 0.5 to 8 lbs. imidazolidinedione per 100 gal. spray will be used. Such application is equivalent to about 0.5 to 20 lbs. imidazolidinedione per acre.

The herbicidal compositions of this invention comprise a herbicidal amount of one or more of the above described imidazolidinediones intimately admixed with a biologically inert carrier. The carrier may be a liquid diluent such as water or acetone or a solid. The solid may be in the form of dust, powder or granules. These compositions will also usually contain adjuvants such as a wetting or dispersing agent to facilitate their penetration into the plant growth media or plant tissue and generally enhance their effectiveness. These compositions may also contain other pesticides, stabilizers, conditioners, fillers and the like.

EXAMPLE 6

Fungus spore test

1 - (2 - fluorophenyl) - 3 - methyl - 5 - (1,2,2-trichlorovinylimino)-imidazolidine-2,4-dione and 1-phenyl-3-methyl-5-(1,2,2-trichlorovinylimino)-imidazolidine were tested for effectiveness against spores of Monilinia fructicola by means of a variation of "The Standard Spore Slide—Germination Method for Determining Fungicidal Activity," described in the American Phytopathological Society Journal, Vol. 33, 627–632 (1943). The method measures the fungitoxic activity of fungicidal chemicals, their activity being expressed in terms of percent inhibition of germination of fungus spores. The compounds tested were dissolved in acetone to a concentration of 10 p.p.m. The solutions were pipetted into the wells of depression slides and allowed to dry. The wells were filled with a suspension of the fungus spores. The spores were then incubated within a moist chamber overnight. A group of 100 spores was examined and the number of spores germinated and not germinated was counted and recorded to show the biological activity in terms of the percent germination inhibition.

Both compounds tested showed 100% germination inhibition.

EXAMPLE 7

Tomato early blight 1-tolyl - 3 - methyl - 5 - (trichlorovinylimino)-imidazolidine-2,4-dione was tested for the control of the tomato early blight organism, Alternaria solani conidia. Tomato (variety: Bonny Best) seedlings of 6 to 7 weeks old were used. The tomato plants were sprayed with a 100 p.p.m. solution of the test compound in an acetone and water solution containing a small amount of a nonionic emulsifier. The sprayed plants were inoculated one day later with the organism, dried and maintained at 60–80% relative humidity for about 12 days. Percent disease control was based on the percent disease development on untreated check plants.

The test compound gave 86% disease control.

When used as fungicides the compounds of the invention are formulated and applied in fungicidal amounts by conventional art methods to fungi or hosts which are subject to fungus attack, especially vegetative hosts such as plants, plant seeds, etc. The amount used will, of course, depend upon several factors such as the host, the type of fungus, the particular imidazolidinedione, etc. The amount used will generally range from 2 to 90% by weight.

The compounds of the invention are generally admixed with biologically inert liquids or solids in an amount from about 0.005 to 95 weight percent. Higher or lower amounts can be used to advantage. Preferably from 1 to 50 weight percent of the composition will be the imidazolidinedione. Typical of the liquid carrier which may be admixed with the imidazolidinediones of this invention include liquids such as acetone, water, kerosene, xylene, alcohols, alkylated naphthylene and glycols. Typical solids which may be incorporated with the imidazolidinediones include the natural clays, such as kaolin clays and diatomaceous earth, synthetic fine silica, talc, pyrophyllite, etc.

Fungicidal formulations may also contain stabilizers, spreading agents, sticking agents, fillers, other compatible pesticides and the like.

As will be evident to those skilled in the art, various modifications in this invention can be made or followed, in the light of the foregoing disclosure and discussion, without departing from the spirit or scope of the disclosure or from the scope of the following claims.

I claim:

1. Compound of the formula

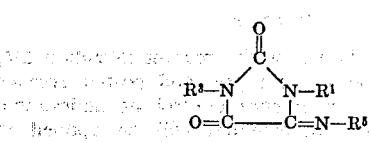

wherein one of $R^1$ or $R^3$ is alkyl of from 1 to 4 carbon atoms and the other of $R^1$ or $R^3$ is phenyl, phenyl substituted with from 1 to 4 halogens of atomic number 9 to 35 or from 1 to 2 alkoxy groups of 1 to 4 carbon atoms, alkylphenyl of 7 to 12 carbon atoms, or alkylphenyl of 7 to 12 carbon atoms and substituted with from 1 to 4 halogens of atomic number 9 to 35 or from 1 to 2 alkoxy groups of 1 to 4 carbon atoms, and $R^5$ is 1-hydroxy-2,2,2-trihaloethyl, 1,2,2,2-tetrahaloethyl trihalovinyl or dihalovinyl wherein the halogen is of atomic number 17 to 35.

2. Compound of Claim 1 wherein one $R^1$ or $R^3$ group is methyl and the other $R^1$ or $R^3$ group is halo-substituted phenyl or alkylphenyl of 1 to 2 halogens of atomic number 9 to 17.

3. Compound of Claim 2 wherein $R^5$ is 1-hydroxy-2,2,2-trihaloethyl.

4. Compound of Claim 3 wherein $R^5$ is 1-hydroxy-2,2,2-trichloroethyl.

5. Compound of Claim 2 wherein $R^5$ is 1,2,2,2,-tetrahaloethyl.

6. Compound of Claim 5 wherein $R^5$ is 1,2,2,2-tetrachloroethyl.

7. Compound of Claim 2 wherein $R^5$ is trihalovinyl.

8. Compound of Claim 7 wherein $R^5$ is trichlorovinyl.

9. Compound of Claim 2 wherein $R^5$ is 2,2-dihalovinyl.

10. 1 - (2 - fluorophenyl) - 3 - methyl-5-(1,2,2-tetrachloroethylimino)-imidazolidine-2,4-dione.

References Cited

FOREIGN PATENTS 2,013,098  3/1970  France _____ 260—309.5

NATALIE TROUSOF, Primary Examiner

U.S. Cl. X.R.

71—92; 424—273